Dec. 8, 1959         W. E. THOMAS              2,915,844
              SHALLOW SCINTILLATING SIGN
Filed Nov. 1, 1956                          4 Sheets-Sheet 1

INVENTOR.
WILLIAM E. THOMAS
BY

ATTORNEYS

Dec. 8, 1959  W. E. THOMAS  2,915,844
SHALLOW SCINTILLATING SIGN

Filed Nov. 1, 1956  4 Sheets-Sheet 2

INVENTOR.
WILLIAM E. THOMAS
BY
ATTORNEYS

Dec. 8, 1959 W. E. THOMAS 2,915,844
SHALLOW SCINTILLATING SIGN
Filed Nov. 1, 1956 4 Sheets-Sheet 3

INVENTOR.
WILLIAM E. THOMAS
BY
ATTORNEYS

Dec. 8, 1959 W. E. THOMAS 2,915,844
SHALLOW SCINTILLATING SIGN
Filed Nov. 1, 1956 4 Sheets-Sheet 4

INVENTOR.
WILLIAM E. THOMAS
BY
ATTORNEYS

United States Patent Office 2,915,844
Patented Dec. 8, 1959

2,915,844

SHALLOW SCINTILLATING SIGN

William E. Thomas, San Francisco, Calif., assignor to Prism Signs Inc., San Mateo, Calif., a corporation of California Application November 1, 1956, Serial No. 619,797

4 Claims. (Cl. 40—132)

This invention relates to and in general has for its object the provision of a scintillating sign so constructed that it can be housed in a relatively shallow case and illuminated by a minimum number of thin tubes of the fluorescent type.

More specifically, the object of this invention is the provision of a sign including an outer optical screen made of a plurality of scrambled, parallel, cylindrical lens segments all having the same radii of curvature and focal lines lying substantially on a common focal plane; a linear light source disposed rearwardly of said outer optical screen; means for reflecting light from said linear light source forwardly towards said outer optical screen; a second optical screen disposed in the path of said light and made up of a plurality of cylindrical lenses so formed that their focal lines lie in said focal plane; and means for translating said second optical screen up and down to thereby cause its focal lines to scan said focal plane and to intercept the focal lines of the lens segments of the outer screen.

The invention possesses other advantageous features, some of which, with the foregoing, will be set forth at length in the following description where that form of the invention which has been selected for illustration in the drawings accompanying and forming a part of the present specification, is outlined in full. In said drawings, one form of the invention is shown, but it is to be understood that it is not limited to such form, since the invention as set forth in the claims may be embodied in other forms.

Referring to the drawings.

Figure 1:
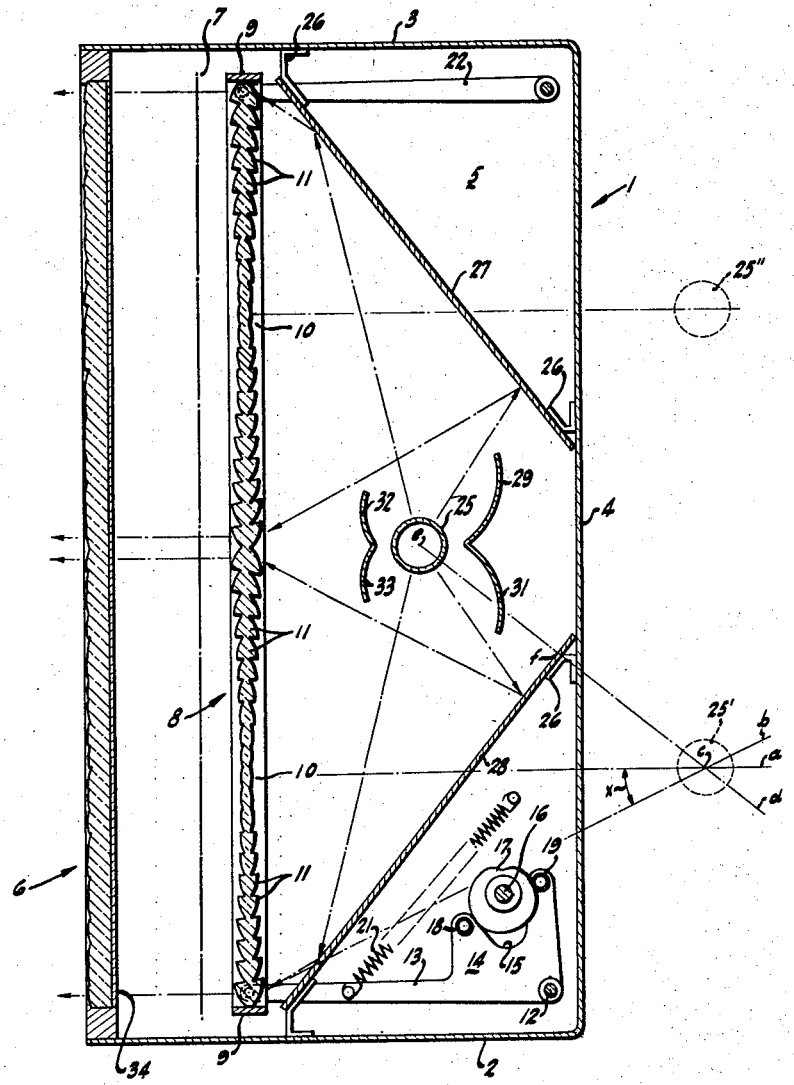
Fig. 1 is a vertical mid-section taken through a sign embodying the objects of my invention.

As more generally shown in Fig. 1, the objects of my invention have been embodied in a sign comprising a housing or casing rectangular in cross-section and generally designated by the reference numeral 1. Included in said casing is a bottom 2, top 3, back 4, and opposed side walls 5.

Framed in the front open end of the housing 1 is a first optical screen generally designated by the reference numeral 6 and made up of a plurality of cylindrical lens segments A' to E' (Fig. 7) non-alphabetically arranged in a repetitive pattern. The details of the screen 6 will be presently more fully explained with reference to Figs. 4 to 9, inclusive. At this point suffice it to say, all of these cylindrical lens segments have equal radii of curvature and have parallel, horizontally disposed focal lines all substantially lying on a common vertical focal plane indicated by the reference numeral 7.

Figure 2:
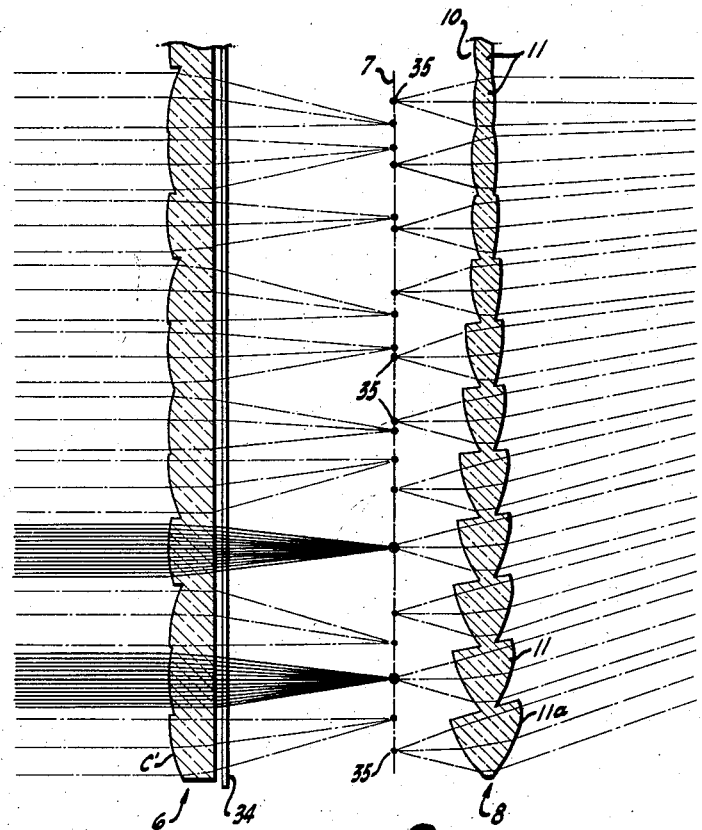
Fig. 2 is an enlarged fragmentary vertical section taken through the two optical screens of my sign and showing the lower halves thereof.

Disposed within the casing 1 rearwardly of the optical screen 6 and in parallelism therewith is a second optical screen generally designated by the reference numeral 8 and mounted in a rectangular supporting frame 9. As will be more fully described presently, the screen 8 is made up of a plurality of parallel, contiguous, cylindrical lens segments 11 so formed and arranged that light entering their rear faces will converge into a plurality of "focal lines," all located on said common focal plane 7 (Fig. 2). If then the optical screen 8 is translated up and down in its own plane its focal lines can be made to scan the focal plane 7 and in so doing, these focal lines will successively intercept the focal lines of the forward optical screen 6. As a result of this, those particular lens segments A' to F' corresponding to the latter focal lines will be illuminated in what may be referred to as a scrambled order.

For the purpose of reciprocating the screen 8, a shaft 12 is journaled in the two opposed side walls 5 of the casing adjacent its lower rear corner. Keyed or otherwise affixed to each end of the shaft 12 within the confines of the casing 1 is the rear end of an arm 13, the forward end of each of these arms being pivoted to one of the lower corners of the screen frame 9. Formed integral with the rear end of each of the arms 13, and extending upwardly therefrom, is a lug 14 formed with a cam recess 15. Also journaled in each of the casing ends 5 is a driven shaft 16, and keyed to each end thereof in vertical registration with the adjacent lug 14 is a cam 17. Journaled on each of the lugs 14 are cam follower rollers 18 and 19 arranged to successively ride their associated cams 17. Fastened to each of the arms 13, intermediate their ends is one end of a tension spring 21, the other end of said spring being anchored to one of the end walls 5.

Pivoted to the upper rear corner of each of the walls 5 is the rear end of a guide arm 22, the forward end of said arm being in turn pivoted to one of the upper corners of the frame 9.

Although not shown, a motor is provided for driving the shaft 16 at a suitable speed. As a result of this construction, the rotation of the shaft 16 causes the optical screen 8 to be translated up and down in its own plane through an amplitude determined by the contour and size of the cams 17. Preferably, the contour of these cams should be such that the change in the direction of movement of the screen 8 is substantially instantaneous.

Mounted within the casing 1, rearwardly of the optical screen 8, is a horizontally extending fluorescent lighting tube 25 paralleling the cylindrical lens segments 11 of the screen 8 and the lens segments A' to F' of the screen 6. Secured to bracket 26 affixed to the casing 1, are diagonally disposed or inclined reflectors 27 and 28 located above and below the tube 25 and arranged to reflect light from the latter generally forward to the screen 8. Mounted on the casing end walls 5, rearwardly of the tube 25 and in parallelism therewith, is a pair of identical arcuate reflectors 29 and 31 arranged to reflect light from said tube generally forward to the screen 8. Also affixed to and bridging the casing walls forwardly of the tube 25 is a pair of rearwardly facing arcuate reflectors 32 and 33 serving the dual function of shielding the central portion of the screen 8 from direct rays from the tube 25 and from light reflected by said tube 25 rearwardly to the reflectors 27, 28, 29, and 31 and hence forwardly to the screen 8.

Figure 4:
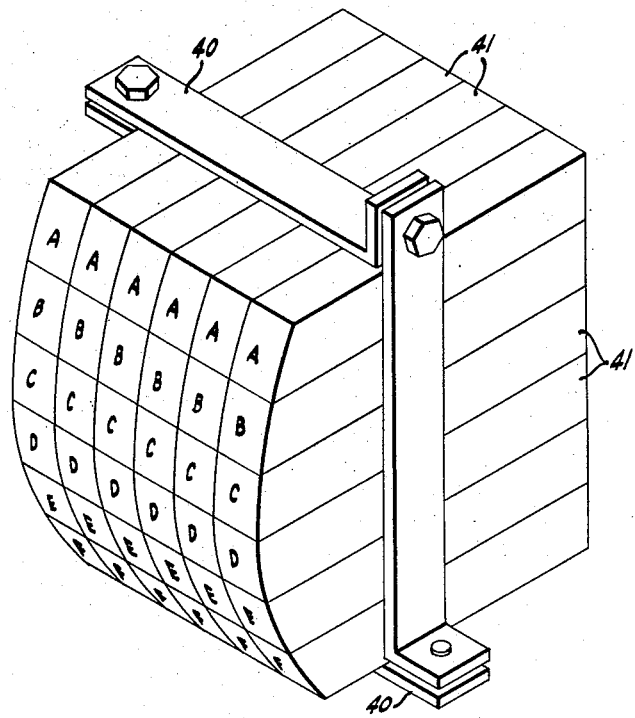
Fig. 4 is an isometric projection of a bundle of identical rods formed at one end with a cylindrical surface.
Figure 6:
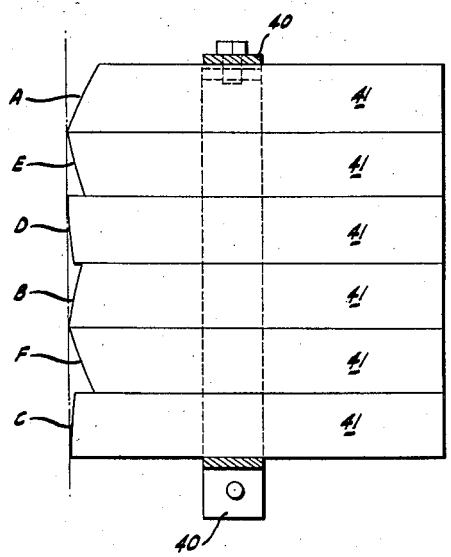
Fig. 6 is a vertical section taken on the section line 6—6 of Fig. 5.
Figure 5:
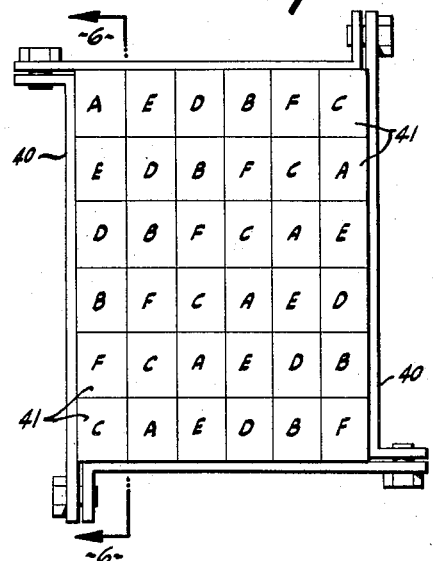
Fig. 5 is a front end view of a bundle of rods similar to that illustrated in Fig. 4, but wherein the rods have been rearranged in the order alphabetically indicated and with their front ends lying in a common plane, said bundle constituting a die suitable for producing an optical screen.
Figure 7:
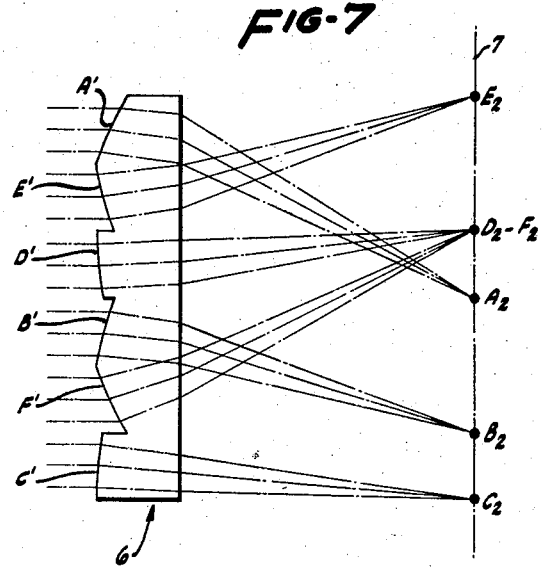
Fig. 7 is an end elevation of an optical screen formed with the die illustrated in Figs. 5 and 6 and diagrammatically showing the focal lines of its lens segments and thier common focal plane.

For the details of the construction and operation of the optical screen 6, reference is had to Figs. 4 to 6, inclusive. To form a die from which the screen 6 can be produced, a plurality of identical rectangular metal rods 41 are rigidly secured in a rectangular bundle by a clamp 40. One end of the bundle is then milled to a cylindrical contour of a predetermined radius. As a result of this, the faces A and F of the top and bottom rows of rods will be identical, and similarly, the faces B and E, and C and D will be identical. However, the slope of the faces A and F, B and E, and C and D will be dissimilar although all of equal radii.

Figure 8:
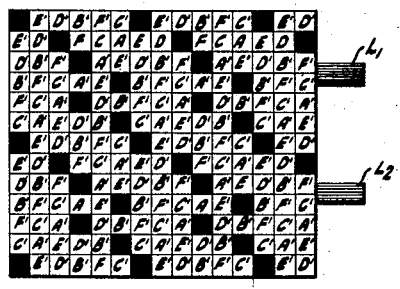
Fig. 8 is a front elevation of a screen of the character illustrated in Fig. 7 and with certain of its lens segments illuminated by a bundle of light rays converging on and passing through the common focal line of certain of said lens segments.
Figure 9:
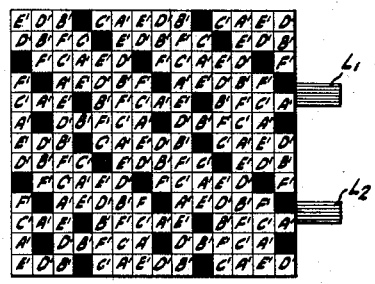
Fig. 9 is a view similar to Fig. 8, but wherein said bundle of light rays has been made to converge on and pass through a different common focal line of certain other and different lens segments and which therefore results in the illumination of said different lens segments.

Following this, the bundle shown in Fig. 4 is rearranged, for example, in the order illustrated in Fig. 5 and with its milled end lying in a common plane as shown in Fig. 6. This rearranged bundle can then be used to form a mold (not illustrated), and from such a mold, or a plurality of them, the optical screen 6 can be made having a forward face consisting of scrambled cylindrical lens segments A' to F' arranged in the order illustrated in Figs. 5-9, inclusive, and which as illustrated in Figs. 8 and 9 may be formed in repetitive squares. It should be noted that the axes of the lens segments are all parallel and horizontally disposed. Since the lens segments are of equal radii of curvature, they all have equal focal distances, and consequently their focal lines would all lie precisely on a common focal plane except for the fact that they have been slightly displaced along their axes so as to make their high edges lie in a common plane. This axial displacement results from the fact that after the bundle of die forming bars 1 were milled to a right circular cylindrical surface as illustrated in Fig. 4 and the bars rearranged in the order shown in Fig. 5, their milled ends were made to lie on a common plane as shown in Fig. 6. Although this displacement of the die bars results in an optical screen in which the focal lines of all of the segments do not lie precisely on a common focal plane, for all practical purposes they may be considered as lying on such a plane. The reason for axially displacing the lens segments is of course to decrease the thickness of the optical screen. This can also be done by diminishing the vertical cross-sectional depth of the lens segments. In summary, the optical screen 6 consists of a plurality of rows and columns of scrambled cylindrical lens segments having parallel, scrambled focal lines all substantially lying in the common focal plane 7, each such line being equal in length to the width of its generating lens segment. If a bundle of light directed towards the rear of the optical screen be made to converge on and pass through any one of these focal lines, the lens segment associated with such focal line will be illuminated. Otherwise considered, the rays of light so illuminating a lens segment are retracing the same path which would be traveled by parallel rays of light directed to the screen from a point forwardly thereof and in a direction normal thereto. Such rays of light would pass through each lens segment and converge on the common focal plane 7 of the optical screen through the focal line of the lens segment in question. In Fig. 8, the shaded lens segments are the particular segments which are illuminated for an observer directly in front of the sign by bundles of light rays from linear light sources $L_1$ and $L_2$ converging on and passing through the focal lines of the illuminated lens segments. In Fig. 9, the light sources $L_1$ and $L_2$ are indicated in positions lower than their positions in Fig. 8, and as a result of this the bundles of rays therefrom converge on and pass through a different group of focal lines to thereby illuminate a different group of lens segments. An observer above or below a plane normal to the sign face will see the same effect but at a different time for each lens facet. This phenomenon is diagrammatically indicated in Fig. 7 wherein the focal lines corresponding to lens segments A'—F' have been indicated by the reference letters $A_2$—$F_2$. From this figure it will be noted that the focal lines of certain of the lens segments $D_1$ and $F_1$ are colinear and that consequently a bundle of rays converging on and passing forwardly through the colinear focal lines $D_2$ and $F_2$ will illuminate the lens segments associated with these focal lines. Here it should be noted that these illuminated segments are vertically as well as laterally displaced. Although the particular orientation of the lens segments of course determines the sequence in which they will be illuminated by one or more linear sources of light made to move up and down at the rear of the device, such orientation is here referred to as a random orientation in the sense that their lens surfaces do not collectively lie on or define a cylindrical surface. Also it should be noted that this type of optical screen differs from a screen consisting of a plurality of rows of symmetrical and identical cylindrical lens segments wherein a source of light moving behind the screen in parallelism with the lens segments would merely result in successively illuminating each lens segment in precisely the order in which it is located on the screen.

Now as to the details of the optical screen 8. Here each of the lens segments 11 is continuous throughout the length of the screen, whereas each lens segment of the screen 6 is relatively short and preferably of a slope different from the slope of its immediate neighbors.

Both the forward and rear faces of the lens segments of the horizontal central zones 10 of the upper and lower halves of the screen 8 may be symmetrical and of right circular cylindrical form and relatively flat.

In general, the configuration of the lens segments 11 should be such that light passing through them from the reflectors 27 and 28 will be so bent as to converge in focal lines 35, all substantially lying on the common focal plane 7 of the optical screen 6. The approximation of this condition depends to some extent upon the inclination of the reflectors 27 and 28, the height of the screen 6 and the depth of the sign. It will be seen from Fig. 2 that the slope (tangent) of the segment surfaces must of necessity be smaller at those zones wherein a greater refraction of light must occur in order to focus the light passing therethrough into focal lines lying on the common focal plane.

Figure 3:
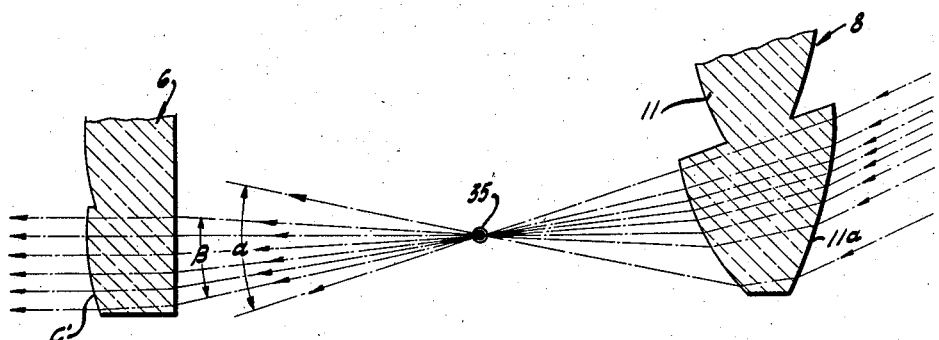
Fig. 3 is an enlarged fragmentary cross-sectional detail of the lower ends of the optical screens illustrated in Fig. 2 and showing their optical interaction.

More precisely, it may be observed that the contours of the outer faces of the lens segments 11 may be identical and formed on an arc having a relatively steep slope. The contours of the inner face 11ª of each of the cylindrical lens segments 11 are a function of the index of refraction of screen 8 and the maximum slope of those particular lens segments A' to F' activated by the lens segments 11 under consideration. As shown in Fig. 3, the form of the lens segments 11 should also be such that the angle α subtended by the light refracted by each lens segment is substantially greater than the angle B subtended by light which would be refracted by the lens segments A'—F' to their respective focal lines on the common focal plane 7. One of the primary reasons for this is to make the sign effective when viewed from elevations somewhat above and below the elevation of the sign. Generally the lens segments 11 can be considered as Fresnel lenses which lenses will give optimum coverage when at least one side of the lens sheet consists of lenses having non-uniform radii of curvature as illustrated.

As a result of this construction, it will be seen that if the optical screen 8 be translated up and down in its own plane, the focal lines 35 of its various lens segments 11 will scan the common focal plane 7, and in so doing, some of these focal lines will intercept and will momentarily be colinear with certain of the focal lines $A_2$—$F_2$ of the lens segments $A'$—$F'$. When this occurs, these particular lens segments will be illuminated as viewed from the front of the sign. When the focal lines 35 coincide with another horizontal lined set of focal lines $A'$—$F'$, other and different lens segments $A'$—$F'$ will be illuminated and in a different and random pattern. For this purpose, the amplitude of movement of the screen 8 should be sufficient to permit its focal lines 35 to scan all of the focal lines $A_2$—$F_2$ during each cycle of operation.

The desired inclination of the reflectors 27 and 28 with respect to the optical screen 8 can be determined by drawing a line a normal to the screen 8 and intersecting the midpoint of its lower half. A line $b$ is then drawn from the lower edge of the screen at a substantially large cut off angle $x$. Following this a line $d$ is drawn through the point $c$ and the center $e$ of the lighting tube 25. The line sector $c$—$e$ is then bisected with a line normal thereto and the reflector 28 should then be placed so as to include this. As a result of this construction an image 25' of the tube 25 will appear to be located with its axis located at the point $c$. A corresponding image 25'' will appear to be similarly located in back of the reflector 27. The screen 8 will then in effect be illuminated by two line sources of light located at the images 25' and 25'' of the single tube 25. By this means it is possible not only to decrease the depth of the sign but in effect to decrease the number of tubes required to illuminate the sign.

Finally, a sign screen 34 having transparent or translucent advertising indicia portions and an opaque or translucent background of a different color is mounted in parallelism with and immediately adjacent the forward optical screen 6 and preferably over its rear plane side.

For large signs, it is contemplated that multiple units of the character above described can be used but of course all mounted in a common case.

Whether single or multiple units be used, the invention above described makes it possible to illuminate an extended sign area with fewer tubes than heretofore possible and to materially reduce the depth of a sign, both of these factors being extremely important, particularly in connection with large signs.

I claim:

1. In a sign comprising an approximately planar outer optical screen including a plurality of contiguous, parallel, cylindrical lens segments having equal radii of curvature and having focal lines lying approximately on a common focal plane; an approximately planar inner optical screen spaced from said outer optical screen and including a plurality of contiguous cylindrical lens segments having focal lines lying on said common focal plane in parallelism with the focal lines of said outer optical screen; a linear source of light disposed rearwardly of said inner optical screen in parallelism with said focal lines; and means for reciprocating said inner optical screen laterally of the linear direction of said light source to cause the focal lines of said inner optical screen to intercept the focal lines of said outer optical screen: the improvement wherein the general slope of the curved faces of adjacent lens segments of said outer optical screen with respect to the plane of said screen is dissimilar so as to cause the focal lines of adjacent lens segments of said outer optical screen to be laterally displaced and the distances between successive focal lines across the face of said common focal plane to vary at random, whereby upon reciprocation of the inner optical screen light is transmitted from said source to the lens segments of said outer optical screen in a recurrent scrambled fashion as the focal lines of said inner optical screen intercept the randomly displaced focal lines of said outer optical screen.

2. In a sign comprising: a linear source of light; a first approximately planar optical screen disposed forwardly of said light source and in parallelism therewith, said optical screen including a plurality of contiguous cylindrical lens segments paralleling said light source for converging light from said source into a plurality of spaced, parallel, focal lines lying on a common focal plane disposed forwardly of said first optical screen; a second approximately planar optical screen disposed forwardly of said first optical screen in parallelism therewith and including a plurality of contiguous cylindrical lens segments of equal radii of curvature paralleling said light source and each having a focal line lying approximately on said common focal plane; and means for reciprocating said first optical screen in its own plane and laterally of the linear direction of said light source to thereby cause the focal lines of its lens segments to scan said common focal plane and to intercept the focal lines of the lens segments of said second optical screen: the improvement wherein adjacent lens segments of said first optical screen have faces with different radii of curvature and wherein the lens segments of said second optical screen are arranged side by side in a plurality of rows with the general slope of the curved faces of adjacent lens segments of a row being dissimilar with respect to the plane of the screen so that the focal lines of said lens segments are displaced laterally in the direction of said rows and the distances between succeeding focal lines across the face of said common focal plane vary at random, whereby upon reciprocation of said first optical screen light is transmitted from said source to the lens segments of said second optical screen in a recurrent scrambled fashion as the focal lines of said first optical screen intercept the randomly displaced focal lines of said second optical screen.

3. In a sign comprising: a linear source of light; first reflectors disposed on the front and rear sides of said light for reflecting light from said source generally upwardly and downwardly; second reflectors disposed above and below said light source and in the path of light from said light source and from light reflected from said reflectors for reflecting light generally forwardly of said light source; a first optical screen disposed forwardly of said light source and in parallelism therewith, said optical screen including a plurality of contiguous cylindrical lens segments paralleling said source of light for converging bundles of light from said second reflectors into a plurality of spaced, parallel, focal lines lying in a common focal plane disposed forwardly of said first optical screen; a second optical screen disposed forwardly of said first optical screen in parallelism therewith and including a plurality of contiguous cylindrical lens segments of equal radii of curvature in parallelism with said source of light each having a focal line lying approximately on said common focal plane; and means for reciprocating said first optical screen up and down in its own plane and laterally of the linear direction of said light source to thereby cause the focal lines of its lens segments to scan said common focal plane and to intercept the focal lines of said lens segments of said second optical screen: the improvement wherein the lens segments of said second optical screen are arranged side by side in a plurality of rows with the general slope of the curved faces of adjacent lens segments in a row with respect to the plane of the screen being dissimilar so as to cause the focal lines of adjacent lens segments to be laterally displaced and the distances between succeeding focal lines across the face of the common plane to vary at random, whereby upon reciprocation of said first optical screen light is transmitted from said source to the lens segments of said outer optical screen in a recurrent scrambled fashion as the focal lines of said first optical screen intercept the randomly displaced focal lines of said second optical screen.

4. In a sign comprising: a linear source of light; reflecting means for reflecting light from said source generally forwardly thereof; a first optical screen disposed forwardly of said light source and in parallelism therewith, said optical screen including a plurality of contiguous cylindrical lens segments paralleling said light source for converging light from said reflecting means into a plurality of spaced, parallel, focal lines lying on a common focal plane disposed forwardly of said first optical screen; a second optical screen disposed forwardly of said first optical screen in parallelism therewith and including a plurality of contiguous cylindrical lens segments of equal radii of curvature paralleling said light source and each having a focal line lying approximately in said common focal plane; and means for reciprocating said first optical screen up and down in its own plane to thereby cause the focal lines of its lens segments to scan said common focal plane and to intercept the focal lines of the lens segments of said second optical screen: the improvement wherein the general slope of the faces of adjacent lens segments of said second optical screen with respect to the plane of said screen is dissimilar so as to cause the focal lines of adjacent lens segments to be laterally displaced and the distances between successive focal lines across the face of said common plane to vary at random, whereby upon reciprocation of said first optical screen light is transmitted from said source to the lens segments of said second optical screen in a recurrent scrambled fashion as the focal lines of said first optical screen intercept the randomly displaced focal lines of said second optical screen.

References Cited in the file of this patent

UNITED STATES PATENTS

| | | |
|---|---|---|
| 2,272,945 | Hotchner | Feb. 10, 1942 |
| 2,272,947 | Hotchner | Feb. 10, 1942 |
| 2,320,884 | Pennow | June 1, 1943 |
| 2,419,216 | Hotchner | Apr. 22, 1947 |
| 2,568,494 | Geissbuhler | Sept. 18, 1951 |
| 2,586,231 | Hotchner | Feb. 19, 1952 |

FOREIGN PATENTS

| | | |
|---|---|---|
| 327,563 | Great Britain | Apr. 10, 1930 |
| 479,722 | Great Britain | Feb. 10, 1938 |